United States Patent [19]

Salibay

[11] Patent Number: 5,840,107
[45] Date of Patent: Nov. 24, 1998

[54] BINDER SOLUTION FOR A SEALING COMPOSITION AND METHOD OF USE

[75] Inventor: Bernardo B. Salibay, Tempe, Ariz.

[73] Assignee: Motorola, Inc., Schaumburg, Ill.

[21] Appl. No.: 47,766

[22] Filed: Mar. 25, 1998

[51] Int. Cl.$^6$ .......................... C09D 101/28; C03C 8/24; B65B 31/32
[52] U.S. Cl. ................... 106/180.1; 106/287.24; 501/15; 501/20; 53/404; 53/DIG. 2
[58] Field of Search ............................ 106/180.1, 287.24; 53/404, DIG. 2; 501/15, 20

[56] References Cited

PUBLICATIONS

CA 121:243421, Mori et al, "Solvents for electrically. . ." Aug. 4, 1994.

CA 100:52416, Stanton, "Rheological aspects of thick film . . ." 1983.

*Primary Examiner*—David Brunsman
*Attorney, Agent, or Firm*—Jasper W. Dockrey; Kathleen A. Tobin

[57] ABSTRACT

A sealing composition (134) includes about 85–95 wt. % glass frit, about 2–8 wt. % butyl carbitol acetate, about 2–8 wt. % alpha-terpineol, about 0.05–0.8 wt. % ester alcohol, and about 0.05–0.8 wt. % low molecular weight ethyl cellulose binder. A method for fabricating an apparatus (100) includes the steps of applying the sealing composition (134) to a portion (132) of the apparatus (100), removing the butyl carbitol acetate, the alpha-terpineol, and the ester alcohol, removing the binder, and heating the glass frit to a sealing temperature of the glass frit.

38 Claims, 1 Drawing Sheet

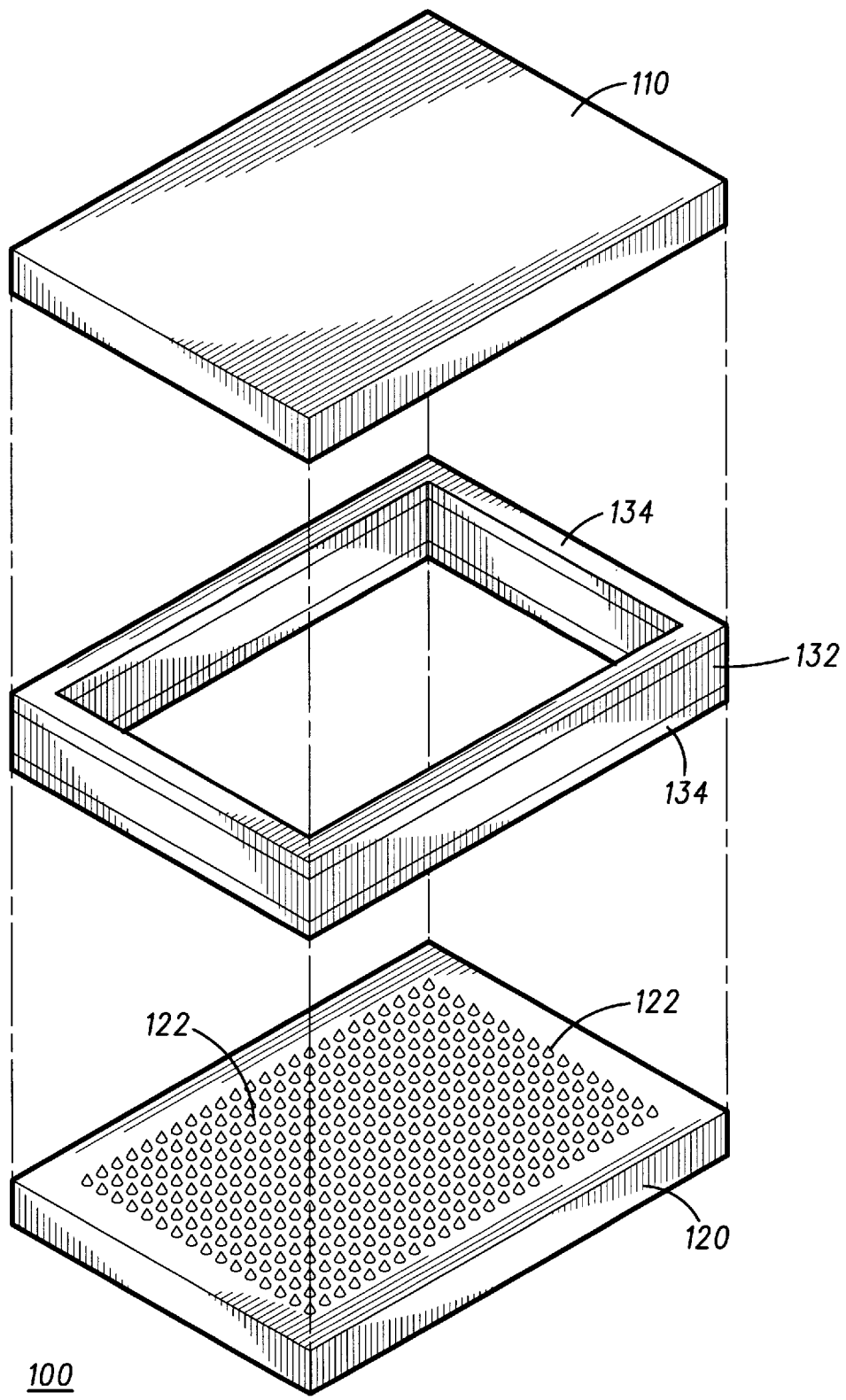

BINDER SOLUTION FOR A SEALING COMPOSITION AND METHOD OF USE

FIELD OF THE INVENTION

The present invention pertains to the area of sealing compositions and, more particularly, to sealing compositions having reduced carbonaceous residues.

BACKGROUND OF THE INVENTION

It is known in the art to use binder solutions for the application of glass frit powders. The binder solutions of the prior art typically contain binders that have a high molecular weight. For example, it is known to form a binder solution from a mixture of nitrocellulose binder and amyl acetate solvent. It is also known to form a binder solution from a mixture of polyisobutyl methylacrylate and butylcarbitol acetate solvent.

It is known in the art to apply the binder solution by, for example, silk-screening. Then, the solution is heated to create the seal. Prior art binder solutions are known to result in seals having a high carbon content.

Certain vacuum devices, such as field emission devices, are adversely affected by seals having a high carbon content. Thus, for these vacuum devices many of the prior art binder solutions present problems of carbon contamination of the vacuum.

Accordingly, there exists a need for an improved binder solution and sealing composition having low carbonaceous residues for use in seals of vacuum devices, such as field emission devices.

BRIEF DESCRIPTION OF THE DRAWING

The sole drawing is an exploded view of a field emission device fabricated in accordance with a preferred embodiment of the invention and including a sealing composition in accordance with the invention.

It will be appreciated that for simplicity and clarity of illustration, elements shown in the drawings have not necessarily been drawn to scale. For example, the dimensions of some of the elements are exaggerated relative to each other.

DESCRIPTION OF THE PREFERRED EMBODIMENTS

The invention is for a binder solution, a sealing composition that includes the binder solution, and a method for fabricating an apparatus employing the sealing composition. The binder solution of the invention includes a low molecular weight ethyl cellulose polymer and a tertiary solvent mixture. The tertiary solvent mixture includes butyl carbitol acetate, alpha-terpineol, and an ester alcohol, such as ethyl n-butyrate, ethyl propionate, 2,2,4-trimethyl-1,3-pentanediol mono(2-methylpropanoate), and the like. The binder solution of the invention is useful for forming seals having a low content of carbonaceous residue. Due to the low content of carbonaceous residue, the binder solution of the invention is particularly useful for forming seals in vacuum devices. The binder solution of the invention is further useful for forming sealing compositions that have enhanced rheological properties. For example, a sealing composition in accordance with the invention is useful in a screen printing operation. A method for fabricating an apparatus in accordance with the invention allows for sealing at low temperatures, which is particularly useful for sealing glass structures.

A binder solution in accordance with the invention preferably has a composition of about 40–50 wt. % butyl carbitol acetate (2-(2-butoxyethoxy)ethyl acetate), about 40–50 wt. % alpha-terpineol ($C_{10}H_{18}O$), about 1–5 wt. % ester alcohol, and about 1–5 wt. % binder. More preferably, a binder solution in accordance with the invention has a composition of 47.5–48 wt. % butyl carbitol acetate, 47–47.5 wt. % alpha-terpineol, 3 wt. % ester alcohol, and 1.75–2.25 wt. % binder.

The binder is selected to provide a binder solution having a low viscosity, which is between about 24–60 centipoise at 25° Celsius (°C.). For example, the binder can be a polymer having a low molecular weight, cellulose acetate, nitrocellulose, and the like.

Preferably, the binder is an ethyl cellulose polymer, which has a molecular weight of less than 40,000. Further, preferably, the ethyl cellulose has an ethoxyl content within a range of 47.5–49.0% of the molecular weight, which corresponds to a degree of substitution within a range of 2.42–2.53 ethoxy groups per anhydroglucose unit. An ethyl cellulose having these properties can be obtained from Hercules Incorporated of Wilmington, Del., sold under the product designation "N-14".

The binder solution of the invention has a tertiary solvent, which includes the butyl carbitol acetate, the alpha-terpineol, and the ester alcohol, as described above. Preferably, the ester alcohol of the tertiary solvent is 2,2,4-trimethyl-1,3-pentanediol mono(2-methylpropanoate). Methods for making and using the binder solution are described below with reference to a method for fabricating an apparatus in accordance with the invention.

A sealing composition in accordance with the invention includes a mixture of the binder solution, as described above, and a glass frit. The particular glass frit for use in the sealing composition is selected to match the expansion properties of the apparatus that is to be sealed. Exemplary glass frits include lead borosilicate, copper aluminoborate, lead aluminosilicate, and the like.

The relative amounts of the binder solution and the glass frit are selected to provide a sealing composition having desirable rheologic properties. For example, for use in a screen printing application technique, preferably the sealing composition has a viscosity within a range of 60,000–80,000 centipoise at 25° C.

Furthermore, the relative amounts of the binder solution and the glass frit depend upon the surface area of the glass frit particles. For example, for a selected viscosity value, the relative amount of the binder solution is increased when the surface area of the glass frit particles increases.

The relative amount of the binder solution in the sealing composition also varies with respect to the viscosity of the binder solution. For example, for a selected viscosity value of the sealing composition, the relative amount of the binder solution is decreased when the viscosity of the binder solution increases.

Preferably, a sealing composition in accordance with the invention has a composition of about 85–95 wt. % glass frit and 5–15% binder solution. Preferably, the sealing composition includes a binder solution having the preferred composition for a binder solution, as described above. That is, the preferred sealing composition has about 2–8 wt. % butyl carbitol acetate, about 2–8 wt. % alpha-terpineol, about 0.05–0.8 wt. % ester alcohol, and about 0.05–0.8 wt. % binder.

More preferably, a sealing composition in accordance with the invention has a composition of about 90–93 wt. % glass frit and 7–10% binder solution. Preferably, the sealing composition includes a binder solution having the preferred composition for a binder solution, as described above. That is, the more preferred sealing composition has about 2.8–5 wt. % butyl carbitol acetate, about 2.8–5 wt. % alpha-terpineol, about 0.07–0.5 wt. % ester alcohol, and about 0.07–0.5 wt. % binder.

An exemplary sealing composition includes 92 wt. % lead borosilicate glass frit and further includes 8 wt. % binder solution. The binder solution of this example has the more preferred composition for a binder solution, as described above. Thus, the sealing composition of this example has 92 wt. % glass frit, 3.8–3.84 wt. % butyl carbitol acetate, 3.76–3.8 wt. % alpha-terpineol, 0.24 wt. % ester alcohol, and 0.14–0.18 wt. % binder. Methods for making and using a sealing composition in accordance with the invention are described below with reference to a method for fabricating an apparatus in accordance with the invention.

A method for fabricating an apparatus in accordance with the invention will now be described with reference to the drawing. In general, the method of the invention is useful for fabricating apparati that have hermetic seals, such as vacuum devices.

The sole drawing is an exploded view of a field emission device (FED) 100 fabricated in accordance with a preferred embodiment of the invention and including a sealing composition 134 in accordance with the invention. FED 100 has a frame 132, an anode plate 110, and a cathode plate 120, which has a plurality of electron emitters 122. It is desired to form hermetic seals between frame 132 and cathode plate 120 and anode plate 110.

The method of the invention can employ any one of the sealing compositions described above. Sealing composition 134 is formed by first combining the butyl carbitol acetate, the alpha-terpineol, and the ester alcohol to form a solvent mixture.

The binder is then dissolved in the solvent mixture to form the binder solution. To facilitate salvation, the solvent mixture is first heated. The binder is added to the heated solvent mixture. The resulting binder solution is heated and stirred to completely dissolve the binder and remove all suspensions. The binder solution is stirred using a stirring speed that does not cause splashing. The duration of the stirring step is selected to cause the complete solvation of the binder and can be between about 4–12 hours.

After the binder is completely dissolved, the binder solution is cooled to room temperature. The compositions of the constituents of the binder solution subsequent to the stirring and cooling steps are substantially the same as their initial compositions.

After the binder solution has been cooled, a glass frit is added to it, to provide sealing composition 134 in accordance with the invention. The glass frit, which is typically in a powdered form, and the binder solution are preferably mixed under vacuum conditions. The pressure during the step of mixing sealing composition 134 is preferably less than about $1.7 \times 10^4$ Pascals.

Sealing composition 134 is mixed under vacuum conditions for at least 20 minutes. Then, sealing composition 134 is milled. After the milling step, sealing composition 134 is mixed under vacuum conditions once more for at least 30 minutes. The vacuum mixing steps prevent the addition of air to sealing composition 134.

Subsequent to the milling and vacuum mixing steps, sealing composition 134 is applied to frame 132. The step of applying sealing composition 134 to a portion of frame 132 can include a convenient application technique, such as screen printing, dispensing using an automatic dispenser, and the like.

Subsequent to the step of applying sealing composition 134, the solvent mixture is removed from sealing composition 134. The removal of the solvent mixture can be achieved by heating frame 132 to a temperature within a range of about 100°–150° C., preferably about 125° C., for a period of time sufficient to remove the solvent mixture. The duration of this drying step can be between 45–60 minutes.

Subsequent to the step of removing the tertiary solvent, the binder is removed from sealing composition 134. The binder is removed by heating frame 132 in air to a temperature at which the binder burns. This heating step removes most of the binder.

Subsequent to the step of burning the binder, frame 132 is cooled to room temperature. After cooling, a vacuum glaze is performed to slightly crystallize sealing composition 134 The vacuum glaze step includes heating sealing composition 134 at a pressure less than about $6.7 \times 10^{-4}$ Pascals to a temperature less than the sealing temperature of the glass frit. The vacuum glaze step is also useful for removing residual binder and trapped air. After the vacuum glaze step, frame 132 is cooled to room temperature.

Subsequent to the step of cooling frame 132, cathode plate 120, frame 132, and anode plate 110 are configured as indicated in the drawing and placed in a fixture. The assembled apparatus is heated in a vacuum oven at the sealing temperature of the glass frit for a period of time sufficient to thoroughly wet the glass frit onto cathode plate 120 and anode plate 110. The assembled apparatus is then cooled to room temperature, thus forming seals at sealing composition 134.

Examples of a binder solution for a sealing composition and method of use in accordance with the invention are set forth below.

EXAMPLE I

A binder solution was formed by mixing 48 wt. % butyl carbitol acetate, 47.25 wt. % alpha-terpineol, 3.00 wt. % 2,2,4-trimethyl-1,3-pentanediol mono(2-methylpropanoate), and 1.75 wt. % ethyl cellulose. The ethyl cellulose had a molecular weigh of 30,000. The ethyl cellulose was further characterized by an ethoxyl content within a range of 47.5–49.0% of the molecular weight, which corresponds to a degree of substitution within a range of 2.42–2.53 ethoxy groups per anhydroglucose unit.

First, the butyl carbitol acetate, alpha-terpineol, and 2,2,4-trimethyl-1,3-pentanediol mono(2-methylpropanoate) were mixed and heated to a temperature of 80° C. while stirring at a mixing speed within a range of 350–450 revolutions per minute. The mixing speed was selected to prevent splashing. The addition of the ethyl cellulose was commenced while the mixture was at 80° C. The temperature of the mixture was increased to 90° C. during the addition of the ethyl cellulose. When the temperature of the mixture reached 90° C., the heating source was turned off. The temperature of the mixture was maintained below 94° C.

After the addition of the ethyl cellulose, the binder solution was stirred for an additional 12 hours to prevent gelling. During the additional stirring step, the binder solution was cooled to about 25° C. at a rate of about 0.5° C. per minute. The viscosity of the binder solution at about 25° C. was 32 centipoise. For this example, it was observed that the viscosity of the binder solution should be within 24–60 centipoise at 25° C., and the color of the binder solution should be pale yellow, not reddish brown.

To form the sealing composition, a lead borosilicate glass frit was added to the binder solution. The lead borosilicate glass frit was selected because its expansion characteristics are similar to those of soda lime glass, the material to which the seal would affix. The composition of the sealing composition was 92 wt. % glass frit and 8 wt. % binder solution.

The sealing composition was mixed at a pressure of $1.7 \times 10^4$ Pascals for at least 20 minutes. Then, the sealing composition was milled. After the milling step, the sealing composition was mixed at a pressure of $1.7 \times 10^4$ Pascals for at least 30 minutes.

Thereafter, a film of the sealing composition was formed on a frame, which was made from soda lime glass. The film was applied by screen printing and had a thickness within a range of about $3.048 \times 10^{-4}$–$3.81 \times 10^{-4}$ meters. Then, the solvent was removed by heating at 125° C. for 60 minutes.

The ethyl cellulose was removed by heating the frame in air to 325° C. at a rate of about 10° C. per minute, maintaining the temperature at 325° C. for about 2 hours, increasing the temperature to 350° C. at a rate of about 5° C. per minute, and maintaining the temperature at 350° C. for about one hour.

Thereafter, the frame was cooled to room temperature at a rate of about 5° C. per minute. The frame was then heated at a pressure of about $6.7 \times 10^{-4}$ Pascal to 350° C. at a rate of 10° C. per minute. The temperature was maintained at 350° C. for 20 minutes, thereafter increased to 385° C. at a rate of about 5° C. per minute, held at 385° C. for an hour, then increased to 425° C. at a rate of about 5° C. per minute, and maintained at 425° C. for one hour and fifty minutes. Thereafter, the frame was cooled to room temperature at a rate of about 5° C. per minute.

The frame was sealed to the substrates of a cathode plate and an anode plate. The substrates were made from soda lime glass. First, the components were assembled in a fixture. Then, the assembly was heated in a vacuum to the sealing temperature (435° C.) of the lead borosilicate glass frit for 60 minutes and thereafter cooled to room temperature.

The seals thus formed had no carbonaceous residue. The method of the example resulted in a sealing composition having useful adhesive properties and Theological properties and a film having no bubbles.

EXAMPLE II

A binder solution was formed by mixing 47.50 wt. % butyl carbitol acetate, 47.50 wt. % alpha-terpineol, 3.00 wt. % 2,2,4-trimethyl-1,3-pentanediol mono(2-methylpropanoate), and 2.00 wt. % ethyl cellulose. The ethyl cellulose had a molecular weigh of 30,000. The ethyl cellulose was further characterized by an ethoxyl content within a range of 47.5–49.0% of the molecular weight, which corresponds to a degree of substitution within a range of 2.42–2.53 ethoxy groups per anhydroglucose unit. The binder solution and sealing composition were prepared and utilized in the manner described with reference to EXAMPLE I.

EXAMPLE III

A binder solution was formed by mixing 47.75 wt. % butyl carbitol acetate, 47.00 wt. % alpha-terpineol, 3.00 wt. % 2,2,4-trimethyl-1,3-pentanediol mono(2-methylpropanoate), and 2.25 wt. % ethyl cellulose. The ethyl cellulose had a molecular weigh of 30,000. The ethyl cellulose was further characterized by an ethoxyl content within a range of 47.5–49.0% of the molecular weight, which corresponds to a degree of substitution within a range of 2.42–2.53 ethoxy groups per anhydroglucose unit. The binder solution and sealing composition were prepared and utilized in the manner described with reference to EXAMPLE I.

In summary, the invention is for a binder solution, a sealing composition, which includes the binder solution, and a method for fabricating an apparatus, which employs the sealing composition. The binder solution of the invention is useful for forming seals having a low content of carbonaceous residue. The binder solution of the invention is further useful for forming sealing compositions that have enhanced rheological properties. A method for fabricating an apparatus in accordance with the invention allows for sealing at relatively low temperatures, which is particularly useful for sealing glass structures.

While we have shown and described specific embodiments of the present invention, further modifications and improvements will occur to those skilled in the art. We desire it to be understood, therefore, that this invention is not limited to the particular forms shown, and we intend in the appended claims to cover all modifications that do not depart from the spirit and scope of this invention.

I claim:

1. A binder solution comprising:
   about 40–50 wt. % butyl carbitol acetate;
   about 40–50 wt. % alpha-terpineol;
   about 1–5 wt. % ester alcohol; and
   about 1–5 wt. % binder.

2. The binder solution as claimed in claim 1, wherein the binder comprises ethyl cellulose.

3. The binder solution as claimed in claim 2, wherein the ethyl cellulose has a molecular weight of less than 40,000.

4. The binder solution as claimed in claim 2, wherein the ethyl cellulose has an ethoxyl content within a range of 47.5–49.0% of the molecular weight and has a degree of substitution within a range of 2.42–2.53 ethoxy groups per anhydroglucose unit.

5. The binder solution as claimed in claim 1, wherein the ester alcohol comprises 2,2,4-trimethyl-1,3-pentanediol mono(2-methylpropanoate).

6. The binder solution as claimed in claim 1, wherein the binder solution has a viscosity within a range of about 24–60 centipoise at a temperature of about 25° C.

7. A binder solution comprising:
   47.5–48 wt. % butyl carbitol acetate;
   47–47.5 wt. % alpha-terpineol;
   3 wt. % ester alcohol; and
   1.75–2.25 wt. % binder.

8. The binder solution as claimed in claim 7, wherein the binder comprises ethyl cellulose.

9. The binder solution as claimed in claim 8, wherein the ethyl cellulose has a molecular weight of less than 40,000.

10. The binder solution as claimed in claim 8, wherein the ethyl cellulose has an ethoxyl content within a range of 47.5–49.0% of the molecular weight and has a degree of substitution within a range of 2.42–2.53 ethoxy groups per anhydroglucose unit.

11. The binder solution as claimed in claim 7, wherein the ester alcohol comprises 2,2,4-trimethyl-1,3-pentanediol mono(2-methylpropanoate).

12. The binder solution as claimed in claim 7, wherein the binder solution has a viscosity within a range of about 24–60 centipoise at a temperature of about 25° C.

13. A sealing composition comprising:
  about 85–95 wt. % glass frit;
  about 2–8 wt. % butyl carbitol acetate;
  about 2–8 wt. % alpha-terpineol;
  about 0.05–0.8 wt. % ester alcohol; and
  about 0.05–0.8 wt. % binder.

14. The sealing composition as claimed in claim 13, wherein the binder comprises ethyl cellulose.

15. The sealing composition as claimed in claim 14, wherein the ethyl cellulose has a molecular weight of less than 40,000.

16. The sealing composition as claimed in claim 14, wherein the ethyl cellulose has an ethoxyl content within a range of 47.5–49.0% of the molecular weight and a degree of substitution within a range of 2.42–2.53 ethoxy groups per anhydroglucose unit.

17. The sealing composition as claimed in claim 13, wherein the ester alcohol comprises 2,2,4-trimethyl-1,3-pentanediol mono(2-methylpropanoate).

18. A sealing composition comprising:
  about 90–93 wt. % glass frit;
  about 2.8–5 wt. % butyl carbitol acetate;
  about 2.8–5 wt. % alpha-terpineol;
  about 0.07–0.5 wt. % ester alcohol; and
  about 0.07–0.5 wt. % binder.

19. The sealing composition as claimed in claim 18, wherein the binder comprises ethyl cellulose.

20. The sealing composition as claimed in claim 19, wherein the ethyl cellulose has a molecular weight of less than 40,000.

21. The sealing composition as claimed in claim 19, wherein the ethyl cellulose has an ethoxyl content within a range of 47.5–49.0% of the molecular weight and a degree of substitution within a range of 2.42–2.53 ethoxy groups per anhydroglucose unit.

22. The sealing composition as claimed in claim 18, wherein the ester alcohol comprises 2,2,4-trimethyl-1,3-pentanediol mono(2-methylpropanoate).

23. A sealing composition comprising:
  92 wt. % glass frit;
  3.8–3.84 wt. % butyl carbitol acetate;
  3.76–3.8 wt. % alpha-terpineol;
  0.24 wt. % ester alcohol; and
  0.14–0.18 wt. % binder.

24. The sealing composition as claimed in claim 23, wherein the binder comprises ethyl cellulose.

25. The sealing composition as claimed in claim 24, wherein the ethyl cellulose has a molecular weight of less than 40,000.

26. The sealing composition as claimed in claim 24, wherein the ethyl cellulose has an ethoxyl content within a range of 47.5–49.0% of the molecular weight and a degree of substitution within a range of 2.42–2.53 ethoxy groups per anhydroglucose unit.

27. The sealing composition as claimed in claim 23, wherein the ester alcohol comprises 2,2,4-trimethyl-1,3-pentanediol mono(2-methylpropanoate).

28. A method for fabricating an apparatus comprising the steps of:
  providing a sealing composition, wherein the sealing composition comprises about 85–95 wt. % glass frit, about 2–8 wt. % butyl carbitol acetate, about 2–8 wt. % alpha-terpineol, about 0.05–0.8 wt. % ester alcohol, and about 0.05–0.8 wt. % binder, and wherein the glass frit has a sealing temperature;
  applying the sealing composition to a portion of the apparatus;
  removing the butyl carbitol acetate, the alpha-terpineol, and the ester alcohol from the sealing composition;
  removing the binder from the sealing composition; and
  heating the glass frit to the sealing temperature of the glass frit.

29. The method for fabricating an apparatus as claimed in claim 28, wherein the binder comprises ethyl cellulose.

30. The method for fabricating an apparatus as claimed in claim 29, wherein the ethyl cellulose has a molecular weight of less than 40,000.

31. The method for fabricating an apparatus as claimed in claim 29, wherein the ethyl cellulose has an ethoxyl content within a range of 47.5–49.0% of the molecular weight and a degree of substitution within a range of 2.42–2.53 ethoxy groups per anhydroglucose unit.

32. The method for fabricating an apparatus as claimed in claim 29, wherein the ester alcohol comprises 2,2,4-trimethyl-1,3-pentanediol mono(2-methylpropanoate).

33. The method for fabricating an apparatus as claimed in claim 28, wherein the step of providing a sealing composition comprises the steps of combining the butyl carbitol acetate, the alpha-terpineol, and the ester alcohol, thereby providing a solvent mixture, dissolving the binder in the solvent mixture, thereby providing a binder solution, and thereafter adding the glass frit to the binder solution.

34. The method for fabricating an apparatus as claimed in claim 28, further comprising, prior to the step of applying the sealing composition, the steps of mixing the sealing composition at a pressure less than about $1.7 \times 10^4$ Pascals, thereafter milling the sealing composition, and thereafter mixing the sealing composition at a pressure less than about $1.7 \times 10^4$ Pascals.

35. The method for fabricating an apparatus as claimed in claim 28, wherein the step of removing the butyl carbitol acetate, the alpha-terpineol, and the ester alcohol comprises the step of heating the sealing composition to a temperature within a range of about 100°–150° C.

36. The method for fabricating an apparatus as claimed in claim 28, wherein the step of removing the binder comprises the steps of burning the binder, thereafter cooling the sealing composition, and thereafter heating the sealing composition at a pressure less than about $6.7 \times 10^{-4}$ Pascals to a temperature less than the sealing temperature of the glass frit.

37. The method for fabricating an apparatus as claimed in claim 36, wherein the step of burning the binder comprises the step of heating the sealing composition to a temperature within a range of about 325°–350° C.

38. The method for fabricating an apparatus as claimed in claim 36, wherein the step of heating the sealing composition at a pressure less than about $6.7 \times 10^{-4}$ Pascals to a temperature less than the sealing temperature of the glass frit comprises the step of heating the sealing composition at a pressure less than about $6.7 \times 10^{-4}$ Pascals to a temperature within a range of 350°–425° C.

* * * * *